C. J. NOLAN.
GLASS BLOWING MACHINE.
APPLICATION FILED NOV. 6, 1908.
1,048,465.
Patented Dec. 24, 1912.
5 SHEETS—SHEET 5.
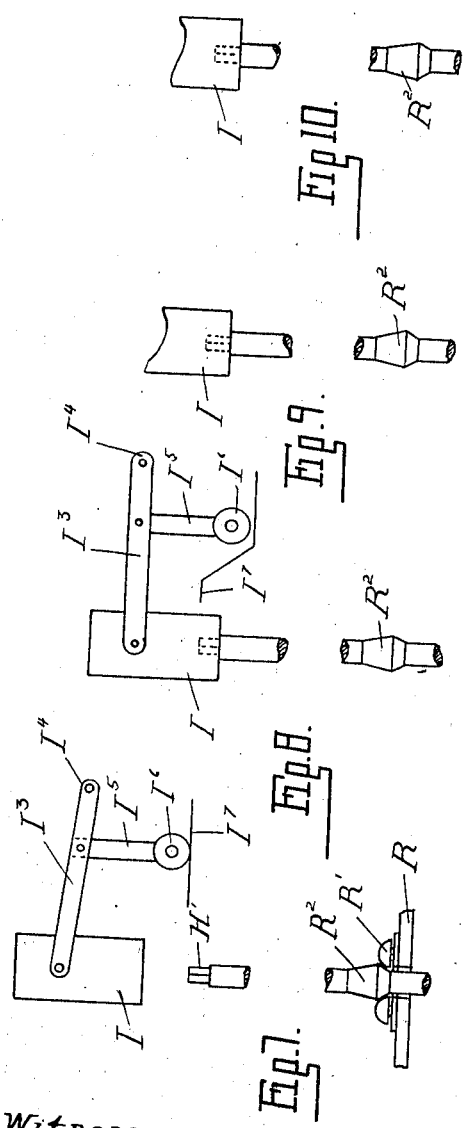
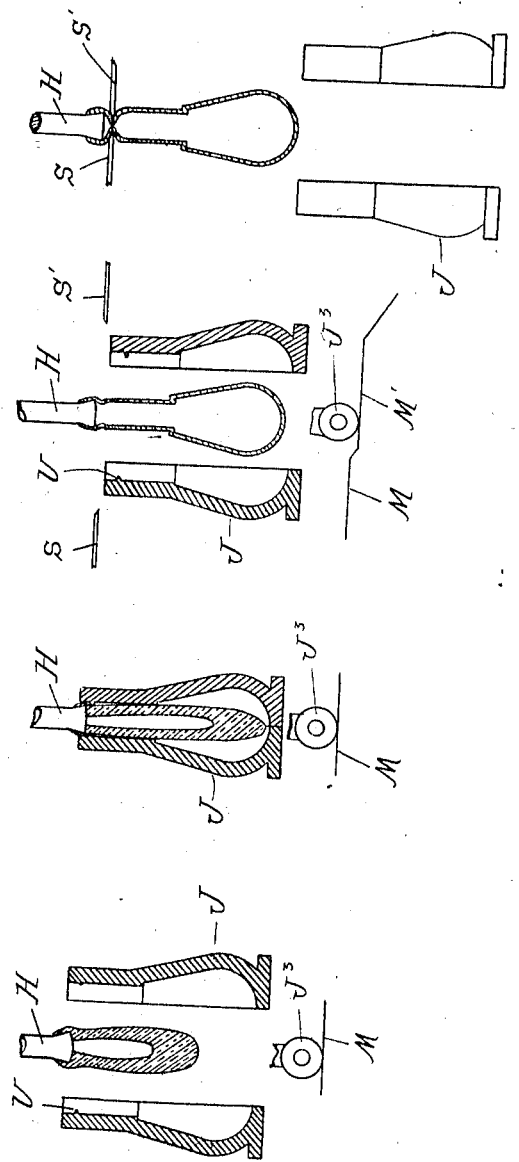
Witnesses
Inventor
Cornelius J. Nolan
By Whittemore, Hulbert & Whittemore
Attys

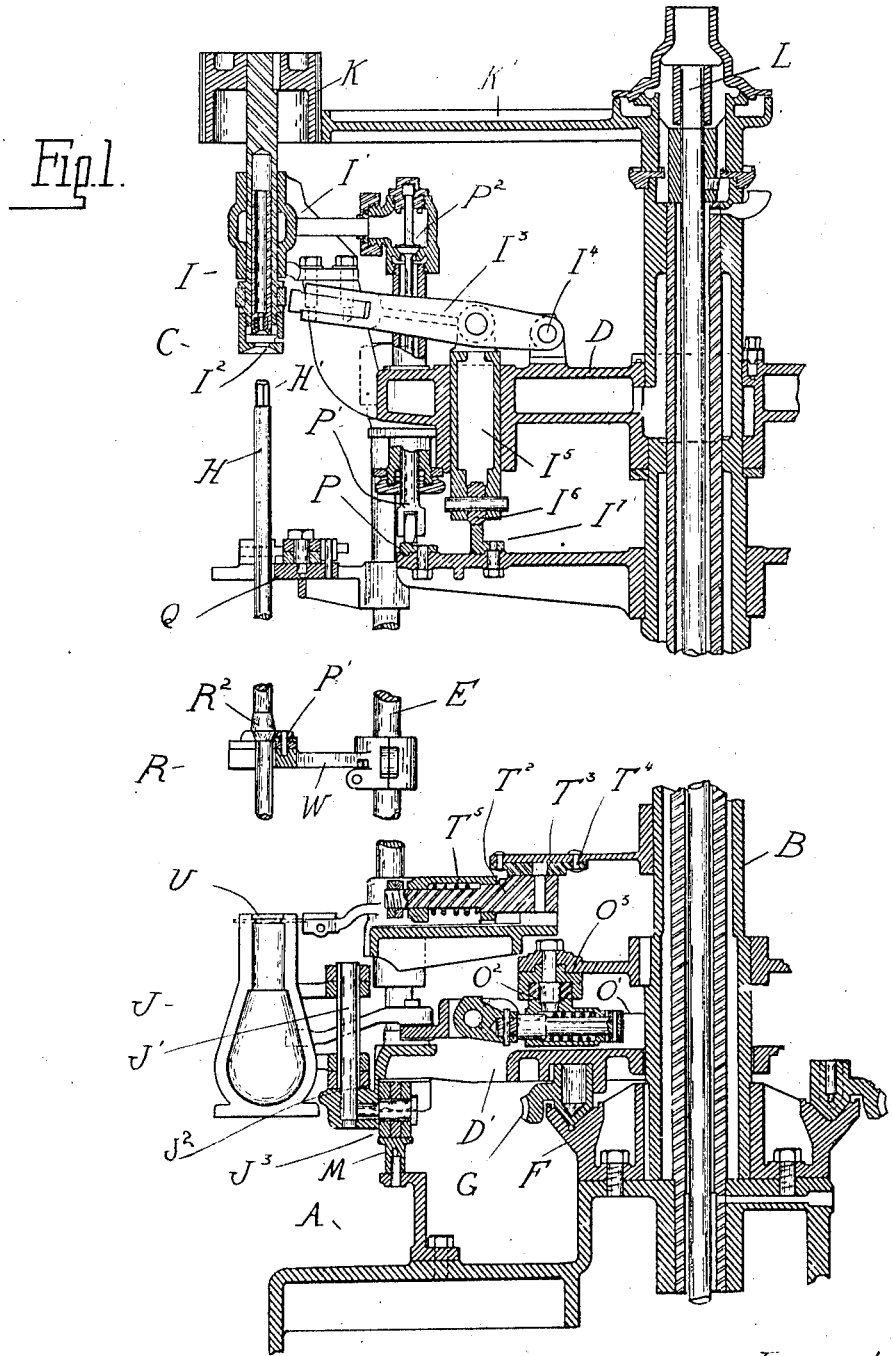

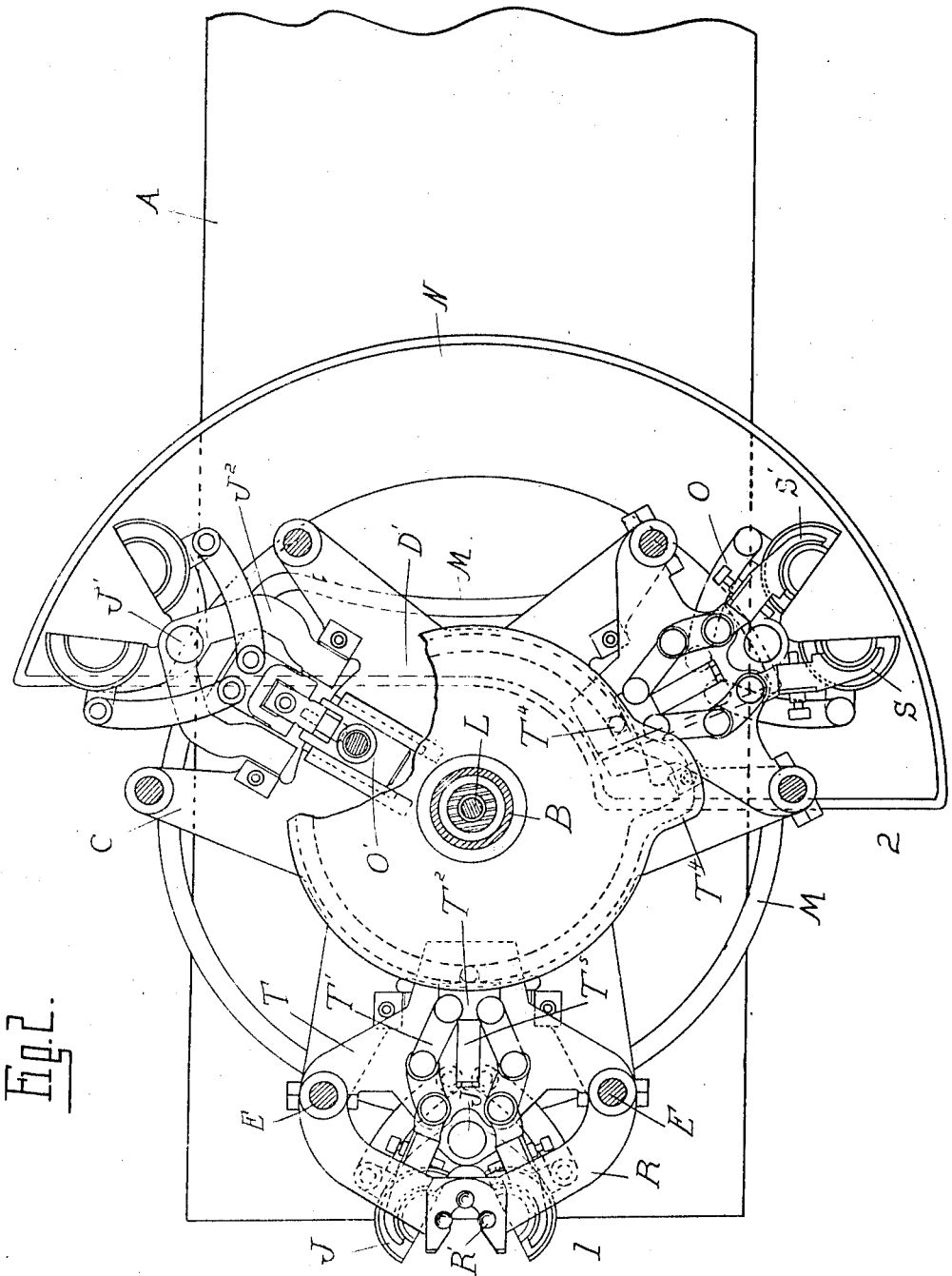

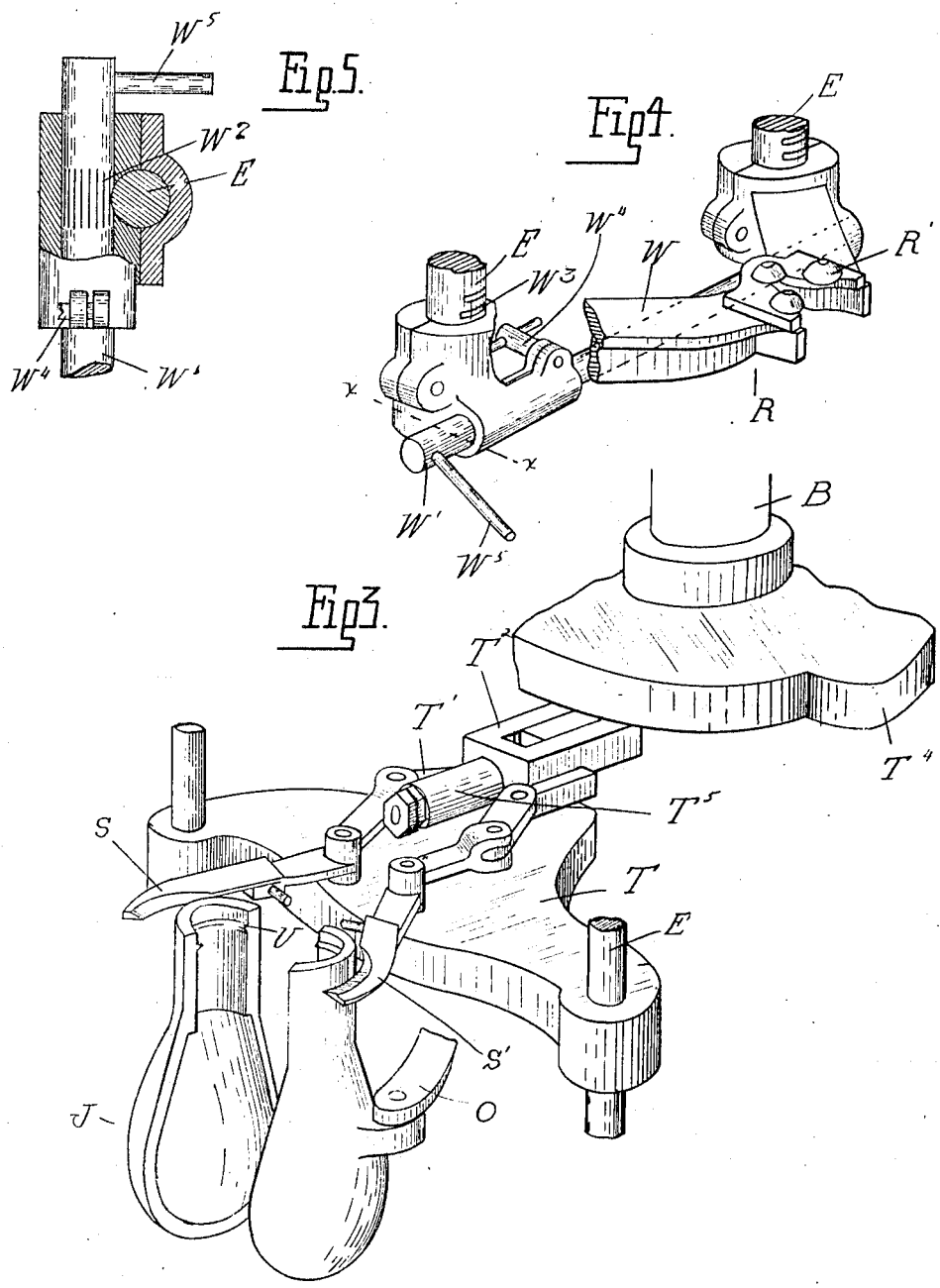

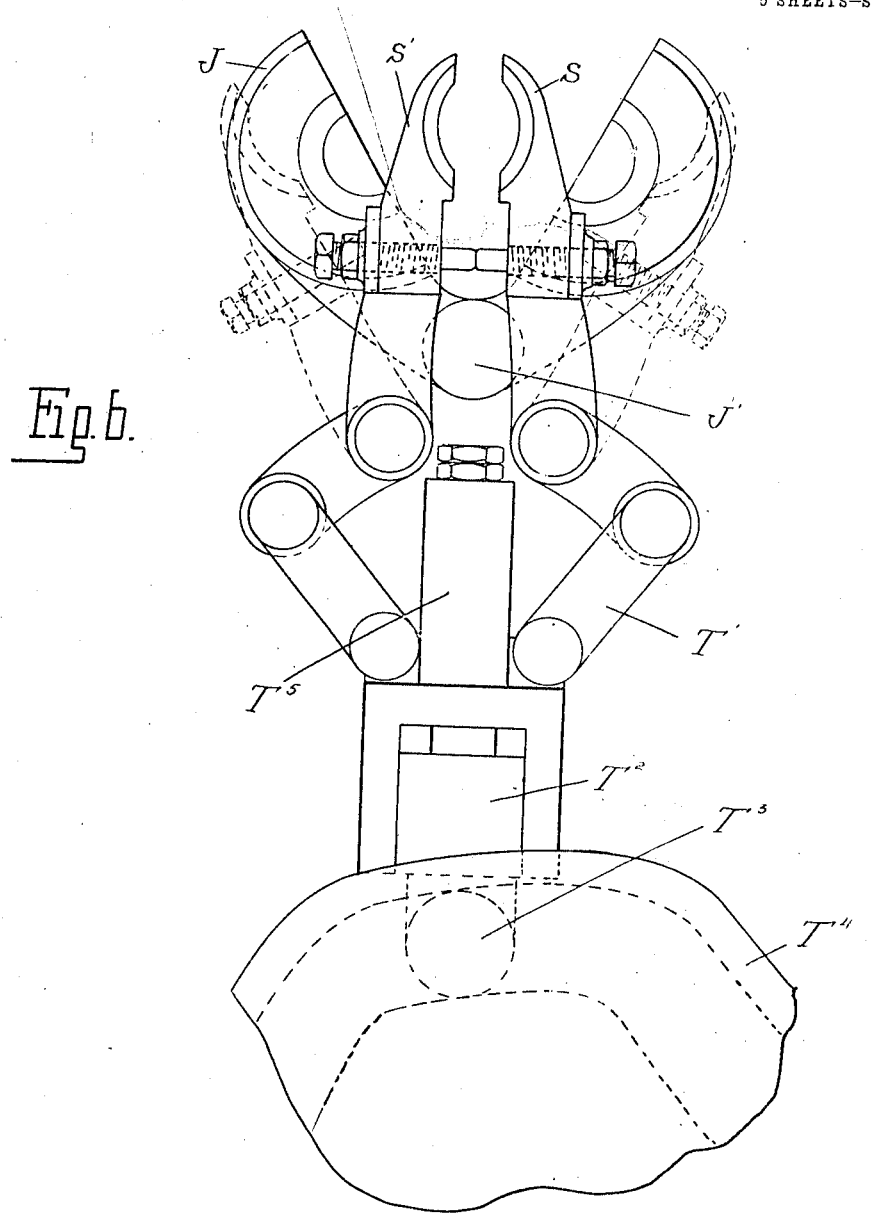

UNITED STATES PATENT OFFICE.

CORNELIUS J. NOLAN, OF TOLEDO, OHIO.

GLASS-BLOWING MACHINE.

1,048,465.

Specification of Letters Patent. Patented Dec. 24, 1912.

Application filed November 6, 1905. Serial No. 461,385.

*To all whom it may concern:*

Be it known that I, CORNELIUS J. NOLAN, a citizen of the United States of America, residing at Toledo, in the county of Lucas and State of Ohio, have invented certain new and useful Improvements in Glass-Blowing Machines, of which the following is a specification, reference being had therein to the accompanying drawings.

The invention relates to glass blowing machines of that type adapted to complete the blowing and fashioning of blanks which have been gathered and prepared by skilled workmen.

The invention consists in the means employed for cutting off the blown article from the blow pipe; further in the construction of the adjustable support for the blow pipe; and, further, in the peculiar construction, arrangement and combination of parts as hereinafter set forth.

In the drawings; Figure 1 is a vertical section through the machine; Fig. 2 is a sectional plan view thereof; Fig. 3 is a perspective view of the blank scoring mechanism; Fig. 4 is a perspective view of the adjustable blow pipe support; Fig. 5 is a section on line $x$—$x$, Fig. 4. Fig. 6 is a top plan view illustrating the relation of the scoring devices and the mold; and Figs. 7 to 10 inclusive are diagrammatic illustrations of the blowing operation.

A is the base of the machine, which is provided with an upwardly-extending pedestal B, upon which is journaled a revoluble frame C. This frame preferably comprises the upper and lower heads D and D', which are connected by a plurality of vertically-extending posts E.

F is an annular bearing upon the base A for the head D', and G is a worm gear for rotating the head secured thereto and surrounding the bearing F.

The blow pipes H are detachably supported upon the revoluble frame C by bearings preferably arranged centrally between pairs of vertical posts E. The upper end of each blow pipe is alined with a vertically adjustable blow head I, and at the lower end is arranged a sectional mold J in which the blank is fashioned. Both the blow head and the mold are carried by the revoluble frame C, and are operated during the rotation of said frame by suitable stationary cams and supporting tracks secured to the pedestal B and the base. The blow head is also revolved about its axis through the medium of a pinion K meshing with a gear wheel K', the latter being coupled to a shaft L passing centrally through the pedestal B.

The mold J is formed in two sections hinged upon the vertical pin or post J' which is connected to a hinged frame J² adapted to swing in a vertical plane. This frame is supported by a roller J³ which travels upon an annular track M upon the base, which track has a depressed portion, permitting the mold to be lowered into a water tank N for the purpose of moistening the paste linings. The sections of the mold J are opened and closed by links O connected to radially movable slides O' upon the head D', said slides being actuated by a roll O² engaging a stationary cam O³ on the pedestal B. Thus during the rotation of the frame C the molds J will be successively dipped in the tank N and in their elevated position will be opened and closed at the proper point for the engagement and disengagement of the work.

The blow head I slidably engages a bearing I' upon the head D of the revoluble frame, and is provided at its lower end with a socket I² for engaging the squared or polygonal upper end H' of the blow pipe H. The head I is raised and lowered to effect disengagement and engagement with the blow pipe by means of a lever I³. This lever is fulcrumed at I⁴ and is supported by a vertically adjustable slide I⁵ having at its lower end a roll I⁶ traveling upon a cam track I⁷ secured to the pedestal B.

P is a cam track adjacent to the cam I⁷ which operates a vertically adjustable stem P' and a valve P², which valve controls the supply of air to the blow head I. The blowing air is admitted through the head D, which is hollow, and is supplied by the latter with suitable connections, not shown.

With a machine constructed as thus far described in operation the head C is intermittently revolved by suitable mechanism (not shown). After each operation, one of the molds will be arranged at the starting point, 1, Fig. 2, where the sections of the mold J are in open position and the blow head I is elevated. The workmen may then insert the blow pipe H having a suitably prepared gather thereon, the blow pipe being engaged with a guide bearing Q and a supporting bearing R, both secured to the post E of the revoluble frame. When thus engaged, the blow pipe will be in alinement with the blow head I, while the gather or blanks will be supported intermediate the open sections of the mold J. As motion is imparted to the revoluble frame C, the blow head I will be lowered by the engagement of the rolls I⁶ with the depressed portion of the track I⁷. The sections of the mold J will also be closed about the blank by the operation of the slide O′ through its engagement with the cam O³, and following these operations the valve P² will be opened to admit blowing air to the head I, which, passing through the pipe H, expands the blank until it fills the mold cavities. During the blowing the blow pipe and gatherer are revolved through the medium of pinions K and gear wheel K′. The movement of the rotary frame C continues until the mold blow pipe reaches the position, 2, Fig. 2, at which point the machine is stopped. Before reaching this stopping point, the valve P² is closed, the sections of the mold J are opened, and the blow head I is raised so that when the machine stops the operator can remove the blow pipe with the blown article attached thereto.

To disengage the blown article, the glass must be cracked to sever it from the portion still adhering to the blow pipe. This operation frequently results in breaking the article, and it is therefore one of the objects of the present invention to avoid such a result. This I accomplish by providing means for creasing or scoring the blank after the mold is open. As shown S and S′ are scoring blades, which are pivotally mounted upon a head T extending between the posts E. T′ are links for rocking the blades S S′ upon their pivots, said links being connected to a slide T² having a roll T³ engaging a cam T⁴ upon the pedestal B. T⁵ is a buffer spring forming a yielding connection between the roll T³ and the slide T². The blades S S′ are arranged to swing in a plane slightly below the upper end of the mold in the position which it occupies during the blowing operation, and the mold is preferably provided with an annular rib or bead U in the same plane which forms a slight groove in the glass neck. The normal position of the blades S S′ is such as to permit the partial opening of the mold sections, which occurs after the completion of the blowing operation. When the mold sections are thus opened, and before the completion of the movement of the frame C, the molds are dropped by a slight depression M′ in the cam track M, and this provides clearance for the operation of the blades S S′. The latter are then pressed inward through the medium of the link T′, slide T², and cam T⁴, pressing in the creased portion of the blank and making a deep score. The blades are then opened again, permitting the removal of the blow pipe from which the blown article may be readily severed by cracking at the score.

As has been previously stated, the blow pipes are supported upon the bearings R which, in order to permit rotation of the pipes, are preferably roller bearing. These roller bearings R′ engage a shoulder or enlargement R² upon the blow pipe and support it in a fixed position. By continued use, the end of the blow pipe is burned off so as to shorten the length, or the distance between the shoulder R² and the lower end of the pipe, and this changes the relation of the gatherer to the mold. To avoid this change, I provide means for adjusting the bearing R′ to compensate for the decreased length of the pipe, the construction being preferably as follows: W is a yoke or cross head which slidably engages the posts E, and at its outer end carries the bearing R. W′ is a shaft having the pinions W² arranged to engage rack teeth W³ formed in a portion of the post C. The shaft W′ is journaled in bearings in the yoke W, and one of these bearings is provided with a clamping screw W⁴ by which the shaft may be locked in any position of adjustment. W⁵ is a crank arm for rotating the shaft W′. With the construction just described, whenever the blow pipe is shortened in length, the clamp W⁴ may be loosened and the arm W⁵ moved to lower the yoke W, until the lower end of the blow pipe is in the proper relation to the mold.

What I claim as my invention is:

1. In a machine for blowing glass, the combination with a revoluble blow pipe, of a reciprocating severing blade having its path of movement in a plane transverse to the plane of the blow pipe, and means for pressing the same against the glass intermediate the end of the blow pipe and the fashioned portion of the blown article.

2. In a machine for blowing glass, the combination with a revoluble blow pipe, of a mold for fashioning the blown article, and means operating after the disengagement of said mold for scoring the glass intermediate the end of the blow pipe and the fashioned portion of the blown article.

3. In a machine for blowing glass, a blow pipe, a mold having an annular rib for defining the line of cut off in the blown article, and means operating after the disengagement of said mold for scoring the glass upon said line of cut off.

4. In a machine for blowing glass, the combination with a blow pipe, of a mold having an annular rib for grooving the blown article in the line of cut off, a scoring blade movable against the glass in the plane of cut off, and means for opening and lowering the mold in advance of the operation of said scoring blade.

5. In a machine for blowing glass, the combination with a blow pipe, of a mold formed of separable sections, a pair of scoring blades upon opposite sides of said mold, means for moving said blades laterally against the blown article, and means for opening and lowering said mold in advance of the operation of said blades.

6. In a machine for blowing glass, the combination with a traveling mold carrier, and a mold thereon; a blow pipe detachably engaging said carrier, a supporting bearing for said blow pipe, parallel vertical guides on said carrier, a cross head slidably engaging said guides upon which said bearing is mounted, and a rack and pinion engagement between said head and guides for vertically adjusting said bearing.

7. In a machine for blowing glass, the combination with a blow pipe, of a mold adapted to engage the lower end of the blow pipe, means for defining a line of cut-off on the glass intermediate the end of the blow pipe and the fashioned portion of the article, and means operated in timed relation to the mold for subsequently scoring the glass along the line of cut-off when disengaged from the mold.

8. In a machine for blowing glass, the combination with a blow pipe, of a mold adapted to engage the lower end of the blow pipe, means for defining a line of cut-off on the glass intermediate the end of the blow pipe and the fashioned portion of the article, and means operatively positioned in relation to the mold for subsequently scoring the glass along the line of cut-off.

In testimony whereof I affix my signature in presence of two witnesses.

CORNELIUS J. NOLAN.

Witnesses:
F. E. WHITMORE,
W. F. DONOVAN.